US012042466B2

(12) United States Patent
Gilson et al.

(10) Patent No.: US 12,042,466 B2
(45) Date of Patent: Jul. 23, 2024

(54) CONTAINER FOR DISPENSING MEDICATION

(71) Applicant: Posologi Innovations, LLC, North Easton, MA (US)

(72) Inventors: Geoffrey Gilson, North Easton, MA (US); Ian Penn, Brockton, MA (US)

(73) Assignee: Posologi Innovations, LLC

( * ) Notice: Subject to any disclaimer, the term of this patent is extended or adjusted under 35 U.S.C. 154(b) by 399 days.

(21) Appl. No.: 17/334,503

(22) Filed: May 28, 2021

(65) Prior Publication Data

US 2021/0369563 A1 Dec. 2, 2021

Related U.S. Application Data

(60) Provisional application No. 63/031,380, filed on May 28, 2020.

(51) Int. Cl.
*A61J 1/03* (2023.01)
*A61J 7/04* (2006.01)
*B65D 83/00* (2006.01)

(52) U.S. Cl.
CPC ............... *A61J 1/03* (2013.01); *A61J 7/0436* (2015.05); *A61J 7/0454* (2015.05); *B65D 83/0083* (2013.01)

(58) Field of Classification Search
CPC ..................................................... A61J 7/0436
USPC ............................................... 221/82, 86, 89
See application file for complete search history.

(56) References Cited

U.S. PATENT DOCUMENTS 4,811,764 A * 3/1989 McLaughlin ......... A61J 7/0084 141/105
5,522,525 A * 6/1996 McLaughlin .......... G16H 20/13 221/15
7,689,318 B2 * 3/2010 Draper ................ G07F 17/0092 221/92

* cited by examiner

*Primary Examiner* — Gene O Crawford
*Assistant Examiner* — Ayodeji T Ojofeitimi
(74) *Attorney, Agent, or Firm* — Quarles & Brady LLP

(57) ABSTRACT

A medication container system, device, and related methods are disclosed for time controlled and secure dispensing of medicine, such as pills, to a patient. The disclosed systems, devices and methods include a plurality of vertically stack of disks which engage adjacent disks in a rotational manner and are housed within a secure container. The disks are configured so that as they rotate they release the doses (e.g. pills) that they hold to a release portion of the device. The disclosed systems, devices and methods provide a number of advantages over previously-known or available devices and methods.

18 Claims, 5 Drawing Sheets

CONTAINER FOR DISPENSING MEDICATION

This application claims the benefit of U.S. Provisional Application No. 62/959,649, filed Jan. 10, 2020 and U.S. Provisional Application No. 63/031,380, filed May 28, 2020.

SUMMARY

There currently exists a severe drug overdose epidemic in the United States, which according to the CDC resulted in the death of more than 70,000 people in 2017. This is a complex epidemic largely driven by heroin and fentanyl. However, controlled prescription medications are often primary or secondary contributors to these overdose events. There were 15.7 billion controlled medication (CM) dose units (pills) and a total of 415.6 million controlled medication prescriptions written in the US in 2016. That represents a 200% increase since 2000.

There is abundant literature documenting the high-risk for controlled medication overuse, misuse, diversion, addiction, and overdose deaths. There are several state and national lawsuits against pharmaceutical manufacturers and distributors alleging that the extreme risk of addiction and misuse associated with controlled medications was well known and that these medications were marketed aggressively thereby contributing to addiction rates and deaths. The CDC has updated its restrictive 2016 guidelines to prescribers both to address the significant dangers associates with the prescribing and managing of controlled medications and in recognition of the fact that many patients continue to need these controlled medications on a daily basis to function and manage chronic daily disease. Therefore, there exists significant projected and ongoing needs to utilize controlled medications in medical practice and significant risks associated with their use.

Consequently, prescribers and patients are caught in this real high-risk situation. While prescribing guidelines exist, and there are some complex and expensive safe dispensing options, there are currently no effective or practical tools available to prescribers and patients that directly address dosing safety.

Currently, medications are distributed in basic plastic pill containers. The patient or other person capable of unscrewing the cap has access to the entire quantity of pills at any given time. This access recurs with every dose and every time the bottle is opened (30-120×/month). This repeated exposure dramatically increases risk for loss, overuse, misuse, diversion, poisoning, and overdose. The continued use of the standard childproof pill bottle first invented in the 1960's for all medication dispensing including high-risk and controlled medications represents a severe safety flaw that puts many thousands of prescription medication users at risk.

In its most basic aspects, the present disclosure provides a simple, safe, and inexpensive smart pill bottle, sized and configured for timed, single-dose dispensing of a medication, such as a controlled class II-IV medication or a high-risk medication as well as non-controlled medications, particularly when timed dosage/medication delivery is of importance.

The primary medication classes suitable for dispensing by the devices and systems of the present disclosure include the controlled classes II-IV. This includes, but is not limited to, opiates, such as morphine, oxycodone, hydromorphone, hydrocodone, and other opiate derivatives; benzodiazepines, such as lorazepam, diazepam, clonazepam, alprazolam, and other benzodiazepine derivatives; amphetamines, such as Adderall, Ritalin, methamphetamine, and other amphetamine derivatives; as well as Suboxone (buprenorphine), pregabalin, and associated atypicals. Although one focus of the present disclosure is to address controlled medication risk, the devices and systems of the present disclosure provide an effective tool for dispensing in a time-controlled manner any medication requiring carefully monitored dosing, including non-controlled/non-scheduled medications.

Further, prescriptions for all medications including controlled medications listed above dictate the periodicity of dosing (i.e. "3 times per day", "at bedtime", or "every 6 hours"), the duration of the prescription (1 week, 1 month, etc.) and the total number of pills prescribed. The pharmacist or other qualified staff typically fills the complete quantity of medication and prints the guidelines on the bottle. In the case of controlled medications, this may equate to 10-120 pills/caps per month.

The present disclosure is directed to a device that is a sturdy and reusable pill dispenser that can be programmed, based on prescribed dosing parameters, to release a single unit dose in a scheduled fashion. Unlike currently existing "safe-dose" options, the present invention is less complex (i.e., simple), hand-held, reliable, mass-producible, and lower cost. The present disclosure provides an easy and effective tool for patients, pharmacists, and prescribers to assist in the continuous safe and scheduled dosing of controlled and high-risk medications as well as non-controlled medications, particularly when timing of dosage delivery is of importance and/or additional doses may lead to adverse effects. The present disclosure is also related to associated systems and methods.

According to the design features of the devices of the present disclosure, the patients and family members do not have easy access or exposure to large pill quantities, but rather only to a single dose that is dispensed according to a predetermined time schedule. For example, when programmed, the device allows for the dispensing or release of a single dose (i.e. one or more pills) at a predetermined time or interval. The device can include a clock or timer that counts down to a predetermined dispensing time (e.g., release of the dose when the timer reaches "0:00"), thus allowing for the dosing as scheduled. The device may also include an override feature that allows a person, for instance an authorized person, to modify, erase, or otherwise reprogram the device for future release of medication.

The devices, systems and methods of the present disclosure equip the prescriber with a degree of certainty that medication is being properly dispensed and overuse risk is thus minimized. Further, the devices and systems of the present disclosure equip the pharmacist with a tool to safely dispense large quantities of pills. Also, the devices and systems of the present disclosure equip the patient with significantly improved medication dispensing and safety, while concomitantly not exposing the patient and other people to large pill counts. A benefit of the secure and controlled release of the medication is that it equips the authorities with a tool to reduce diversion and illegal sale of controlled medications. Most importantly, the devices and systems of the present disclosure have the potential to prevent tens of thousands of people from being accidentally poisoned and saving people from unintentional and intentional overdose events.

Other objects, advantages and novel features of the present disclosure will become apparent from the following detailed description when considered in conjunction with the accompanying drawings, all of which are contemplated to be part of the inventive disclosure.

BRIEF DESCRIPTION OF THE DRAWINGS

Features and advantages of the present disclosure will become apparent to those skilled in the art from the following description with reference to the drawings, in which.

DETAILED DESCRIPTION

Figure 1:
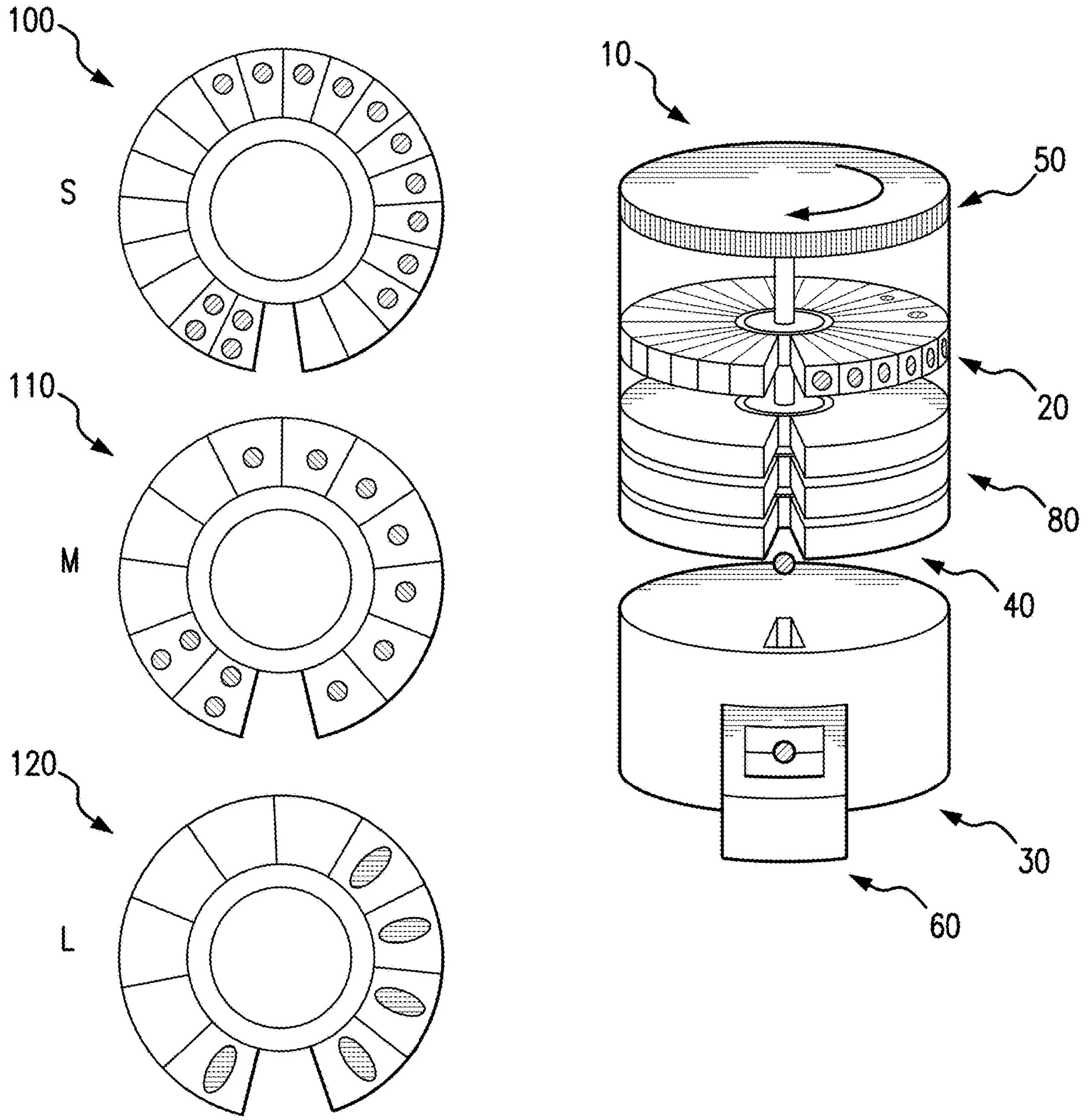
FIG. 1 shows a partial cut away view of a medication dispensing device and views of the disks that make up the disk stack.

For simplicity and illustrative purposes, the principles of the present disclosure are described by referring mainly to various exemplary embodiments thereof. Although the preferred embodiments are particularly disclosed herein, one of ordinary skill in the art will readily recognize that the same principles are equally applicable to, and can be implemented in other systems, and that any such variation would be within such modifications that do not part from the true spirit and scope of the present disclosure. Before explaining the disclosed embodiments in detail, it is to be understood that the disclosure is not limited in its application to the details of any particular arrangement shown, since the teachings are capable of other embodiments. The terminology used herein is for the purpose of description and not of limitation.

The devices and systems of the present disclosure include a novel pill bottle assembly 10 including medication dispensing mechanisms that comprise several components. In one embodiment, the components interlock to make a full assembly. Exemplary embodiments are shown in FIGS. 1-5. The container 10 of the present disclosure includes a durable outer shell or housing 20 that slides over all components and may lock to a base 30 and has an integrated pill storage disk stack 40 which may be pre-filled by a pharmacist or other authorized user. The container 10 also includes a time-locked, manually twisting top 50, that mechanically rotates the pill stack 40 to release a single dose of medication with each activation. The container housing 20 and base 30 may be separate components or they may be provided as a single integrated unit.

The illustrated housing 20 is preferably a cylindrical and/or smooth sheath which may be made of the same durable material (e.g. aluminum, stainless steel, plastic, PVC, etc.) as the base 30. The housing 20 is preferably resistant to destruction or damage, for instance through mechanical, chemical, heating, melting, or other means. In one embodiment, the housing 20 is, to a degree, indestructible, so as to deter and make difficult, access to the medication inside, thereby discouraging misuse or abuse of the medication. The housing 20 may have a locking mechanism, for instance either a mechanical, electronic, magnetic, Bluetooth or digital lock (or any combination of common locking mechanisms) that locks the housing 20 securely to the base 30, when they are provided as separate components. The lock permits only the pharmacist or other authorized user the ability to lock and unlock the housing 20 and access the inner components including the disk stack 40 and its compartments and the related mechanisms inside the assembly 10.

Figure 3:
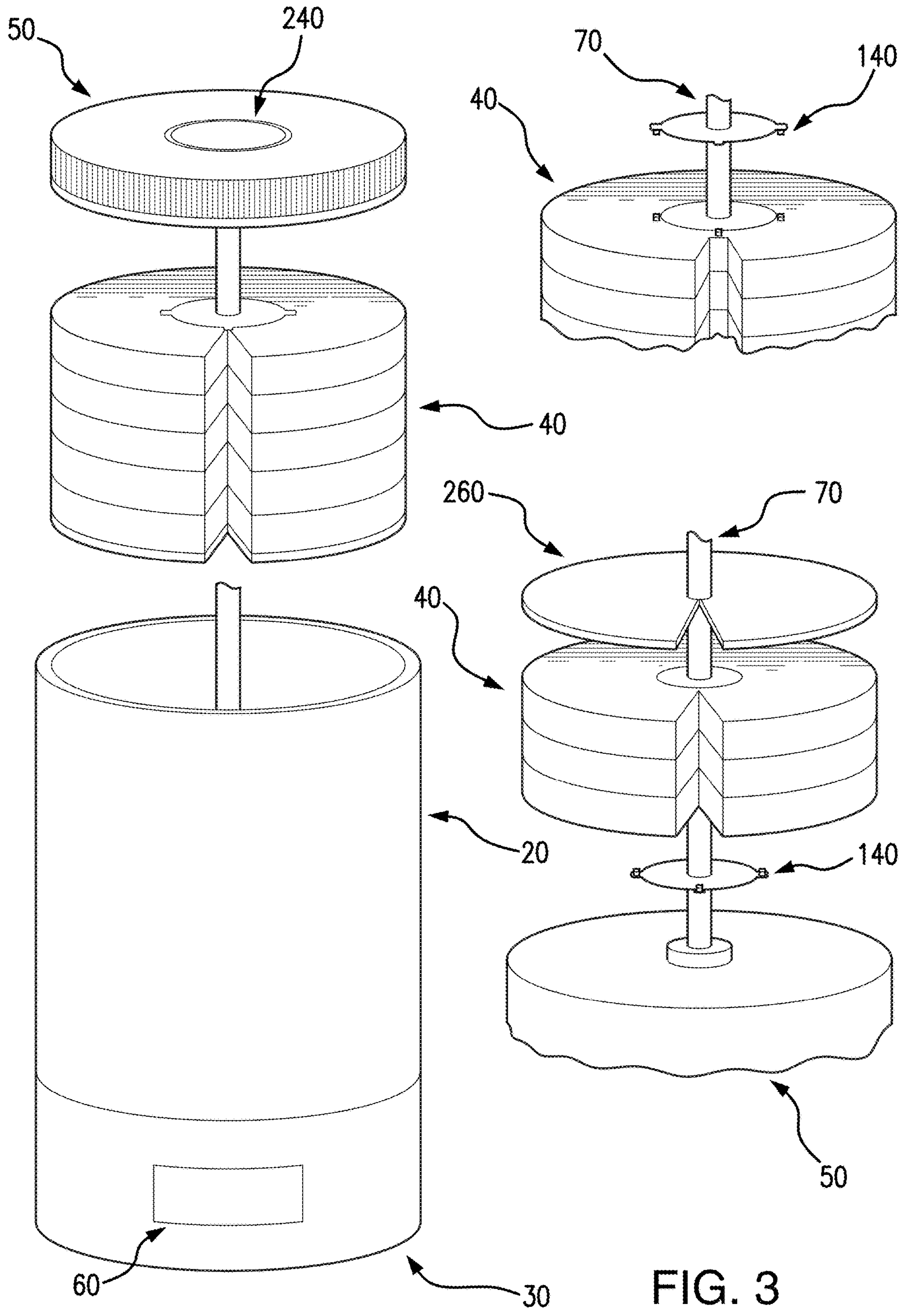
FIG. 3 shows an exploded view of a medication dispensing device and certain internal components.

The housing 20 slides over all the body components, preferably in a seamless fashion. When "locked", the housing 20 cannot be unscrewed or otherwise removed and there is no access to the medications inside the assembly 10 (aside from the medication dispenser 60). The seamless nature of the housing 20 and its durable construction make it secure and relatively tamper proof. Alternatively, the top 50 of the device, which preferably includes a twist cap mechanism, can be removable for placing the pills and associated containers (e.g., disk stack 40) within the housing 20 (FIG. 3). Alternatively, the top 50 can be integrally coupled or formed with the housing 20.

Figure 5:
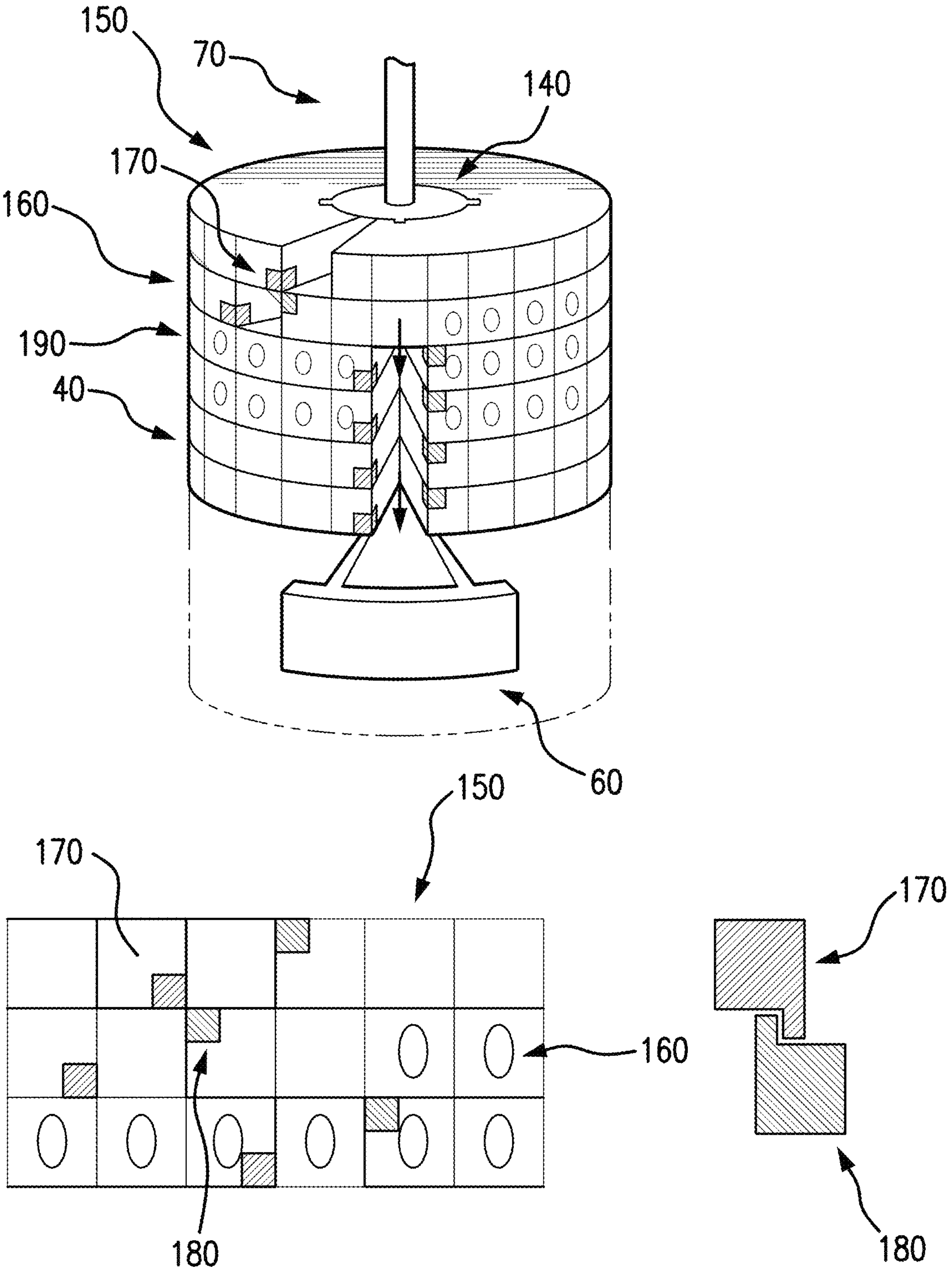
FIG. 5 shows a view of the disk stack and the interaction of disks relative to one another

As shown in FIGS. 1, 3 and 5, the illustrated pre-filled, pill disk stack 40 is stabilized by a shaft 70. The shaft 70 may connect to and extend between the rotatable top 50 and the base 30. The stack 40 includes a plurality of disks, e.g., disk 80, each disk 80 including a plurality of compartments for each pill dose. Each disk 80 may be manufactured from a suitable material such as plastic, metal, or other. Each disk 80 may be provided with wedge, rectangular, or otherwise appropriately shaped compartments. The disks 80 may be inverted to be filled and once filled by the pharmacist, technician, or other authorized filler or user, a plurality of disks 80 may stacked onto the shaft 70. Depending the arrangement, the compartments in the disks 80 may have a closed top surface and an open bottom so that keeping the stack 40 inverted prevents the medication from falling out. Once assembled, the plurality of disks 80 and shaft 70 may be inserted into the rotating top mechanism and the base 30 and covered by the housing 20. With the manual rotation of the rotatable top 50 by the user, the shaft 70 is rotated, thereby rotating one or more pill disks 80, which permits the gravity-driven release of a single dose to the base 30 and medication dispenser 60.

The device and system of the present disclosure may optionally include pill disks 80 with unit reservoirs of varying sizes and shapes that can accommodate the wide variety of pill and capsule shapes and sizes, as well as combinations of pills, capsules, etc. For instance, one form is disk 100 and another form of disk 110, any of a variety of suitable disks 80, 100 or 110 may be suitable. Each disk 80 may hold a varied number of pills, capsules, gels, doses, etc. depending on dose, size, and shape. Disks 80 are stacked vertically on the shaft 70. In one embodiment, a rotation of the top 50 rotates the shaft 70. In one embodiment, only the top disk (the uppermost disk) is mechanically and/or fixedly connected to the shaft 70 by a shaft connector 140. The shaft connecter 140 may be fixedly connected to the shall 70 and may include protrusions, teeth, tabs, or other engagement members which engage the uppermost disk. The disks underneath (the lower disks) are stabilized in position relative to the base 30 by the shaft 70 and allowed to rotate about the axis formed by the shaft 70. This allows for easy transport of the disk stack 40.

Referring to FIG. 5, once the top disk 150 has completed a full rotation and thereby released all its stored pill doses, it locks to or otherwise engages the disk 160 directly beneath it by the illustrated tabs 170 and 180 on the respective disks 150 and 160. Alternatively, the tabs 170 and 180 may be provided in the form of ridges, protrusions, catches, teeth, or other suitable engagement mechanisms. The lower disk 160 then begins to fractionally rotate and release its doses as the movement of the upper disk 150 rotationally pushes the lower disk 160. Once the lower disk 160 has completed a full rotation and thereby released all its stored pill doses, it locks to or otherwise engages the disk 190 directly beneath by a similar tab, or other suitable engagement mechanism. As each of the remaining disks in the stack 40 are provided similar tabs or other suitable engagement mechanisms, with each turn of the rotatable top 50, this process continues until each of the disks have been locked (or engaged) to the disk above it, and after such lock or engagement, completed their full rotation, thereby releasing all of their doses.

The illustrated pill stack delivery system 10 is configured to deliver one or more pills into the medication dispenser 60 in a consistent manner with each suitable rotation of the top 50. The rotatable top 50 may be locked from rotation until the pre-programmed timing mechanism releases it. In one embodiment, the rotatable top 50 can only be twisted once a timer lock is disengaged. In a preferred embodiment, the rotatable top 50 includes a safety features such that only specific movements allow rotation of the top 50, for instance, depressing the top 50 relative to the assembly 10 and rotating the top 50 only after it has been depressed.

In one embodiment, an assembly 10 is provided with a plurality of stacked medication dose storage disks 40, each disk 80 having a generally flat circular shape, each disk 80 having a plurality of defined storage compartments (as shown in the drawings of the disks 100, 110 and 120) for holding individual doses of medication, each storage compartment having two side walls, the side walls extending radially outward from near the middle of each circular disk 80. One or more of the stackable medication dose storage disks 80 has a gap configured to allow a pill to pass from a storage disk above it (as shown in the drawings of the disks 100, 110 and 120, and, for instance, FIG. 1, through the storage disk and to a dispenser 60 (or dispensing area) below the stack of storage disks 80, the gap having two side walls, the side walls extending radially outward from near the middle of the circular disk, the plurality of stackable medication dose storage disks 80 being arranged so that when the disks are stacked and the gaps of several of the disk are aligned, a pill can pass through the gaps of several stacked medication dose storage disks to a dispenser.

In one embodiment, one or a plurality of the medication dose storage disks 80 is provided with a top wall for each storage compartment, the top wall being provided above the compartment.

In one embodiment, a flat planar separator 260 is provided adjacent one or more of the medication dose storage disks 80. The separator 260 may have a gap configured to allow a pill to fall through said gap when a storage compartment on an adjacent storage disk 80 is aligned with the gap.

In one embodiment, a plurality of flat planar separators 260 are provided one separator 260 being provided between adjacent storage disks 80 so as to separate individual doses of medications from the doses in the adjacent storage disks 80. Each separator 260 may have a gap configured to allow a pill to fall through said gap when a storage compartment on an adjacent storage disk 80 is aligned with the gap.

In one embodiment, a shaft 70 extends through the central axis of the plurality of stacked medication dose storage disks 40 such that a plurality of stacked medication dose storage disks 40 can rotate about the shaft. In particular, a set of the plurality of stacked medication dose storage disks 40 can rotate about the shaft. In one embodiment, the top most medication dose storage disk 80 is fixedly attached to the shaft 70 or the rotatable top 50, while the remaining medication dose storage disks 80 are allowed to rotate about the shaft 70.

Referring to FIG. 5, in one embodiment, a lower engagement mechanism 170 is provided on a medication dose storage disk 150 included within the plurality of stacked medication dose storage disks 40. And an upper engagement mechanism 180 is provided on a medication dose storage disk 160 included within the plurality of stacked medication dose storage disks 40. The lower engagement mechanism 170 on one medication dose storage disk 150 is configured to engage the upper engagement mechanism 180 on an adjacent medication dose storage disk 160 such that when the lower engagement mechanism 170 and the upper engagement mechanism 180 are engaged, the two adjacent medication dose storage disks 150 and 160 rotate together.

Each of the upper engagement mechanism 180 and the lower engagement mechanism 170 may be selected from the group consisting of an edge, bevel, tab, block and protrusion, tooth, teeth, magnet, electronically controlled magnet, or other similar feature.

In a preferred embodiment, the device 10 includes a plurality of medication dose storage disks 40, each having an upper engagement mechanism 180 and a lower engagement mechanism 170.

The device 10 may further include a rotatably attached top 50, an outer shell or housing 20 and a base 30. The housing 29 is preferably configured to securely engage the top 50 and the base 30 and thereby provide a secure container for the medication to be stored and dispensed therefrom.

In a preferred embodiment, housing 20 and the base 30 are formed as a single component.

The device 10 may also include a lock mechanism. The lock mechanism configured to only allow release of a medication dose from the device after a predetermined period of time has passed.

The device 10 may also include a dispenser 60 in the base 30. The dispenser may be provided with an opening mechanism. The dispenser 60 may be configured to receive a medication dose released from the stacked medication dose storage disks 40 and the opening mechanism being configured to allow a user to withdraw the released medication dose from the dispenser 60 and thus from the device 10.

The device 10 may also include a timer with a display 200. The timer 200 may operate to unlock a locking mechanism upon passage of a predetermined time period. The locking mechanism may prevent rotation of the rotatable top 50 relative to the assembly 10 until the locking mechanism is unlocked.

The timer 200 and locking mechanism may configured so that rotation of the rotatable top resets the timer and locks the locking mechanism, effectively securing the assembly 10 until the predetermined time period has passed.

The locking mechanism may include a servomotor operating an engagement arm to prevent rotation of the rotatable top 50 relative to the device 10.

The device may be provided with a reload lock mechanism. The reload lock mechanism is configured to allow an authorized user to open and reload the medication doses into the medication dose storage disks 40.

Figure 2:
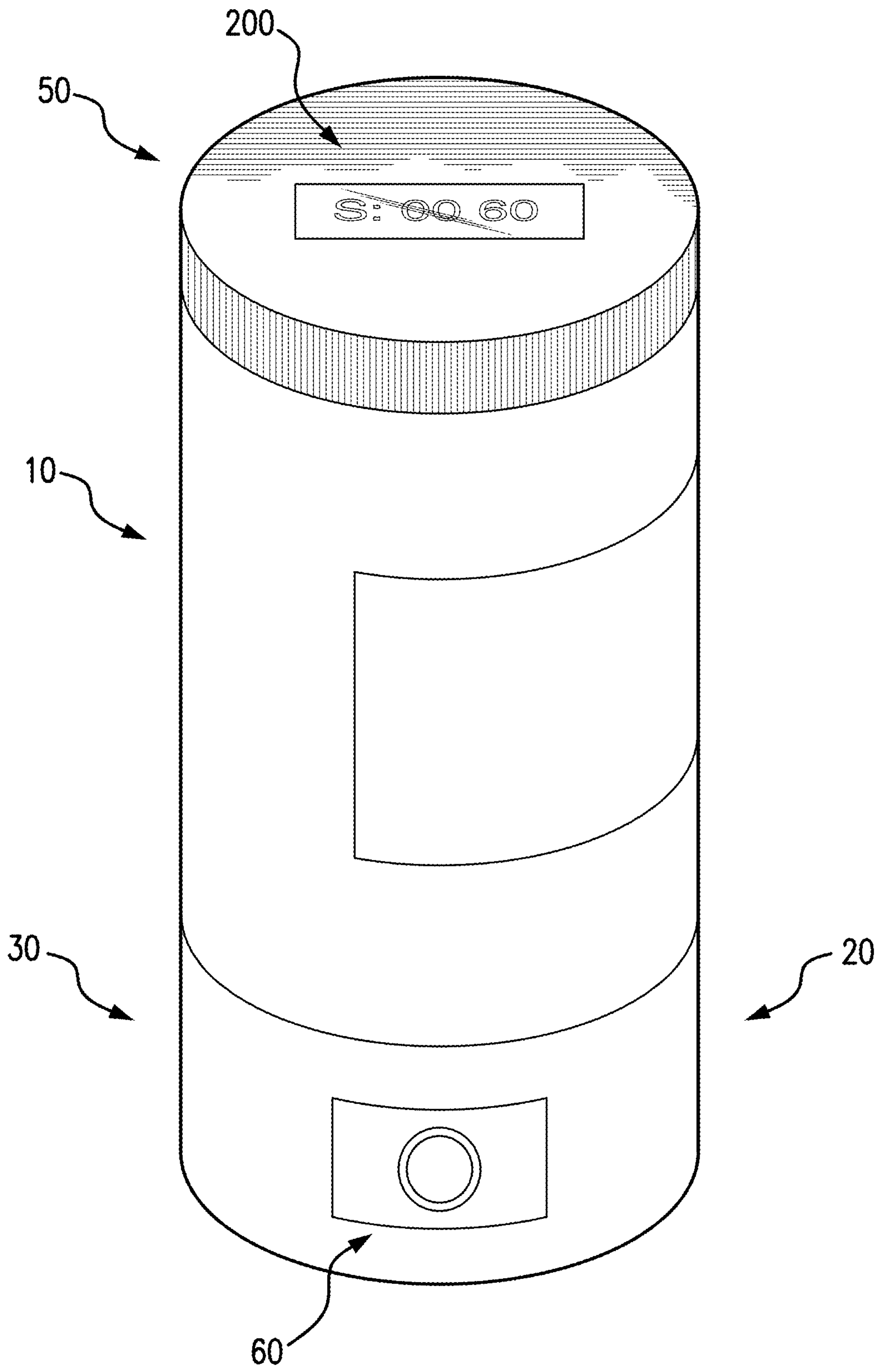
FIG. 2 shows a lateral perspective view of a medication dispensing device.
Figure 4:
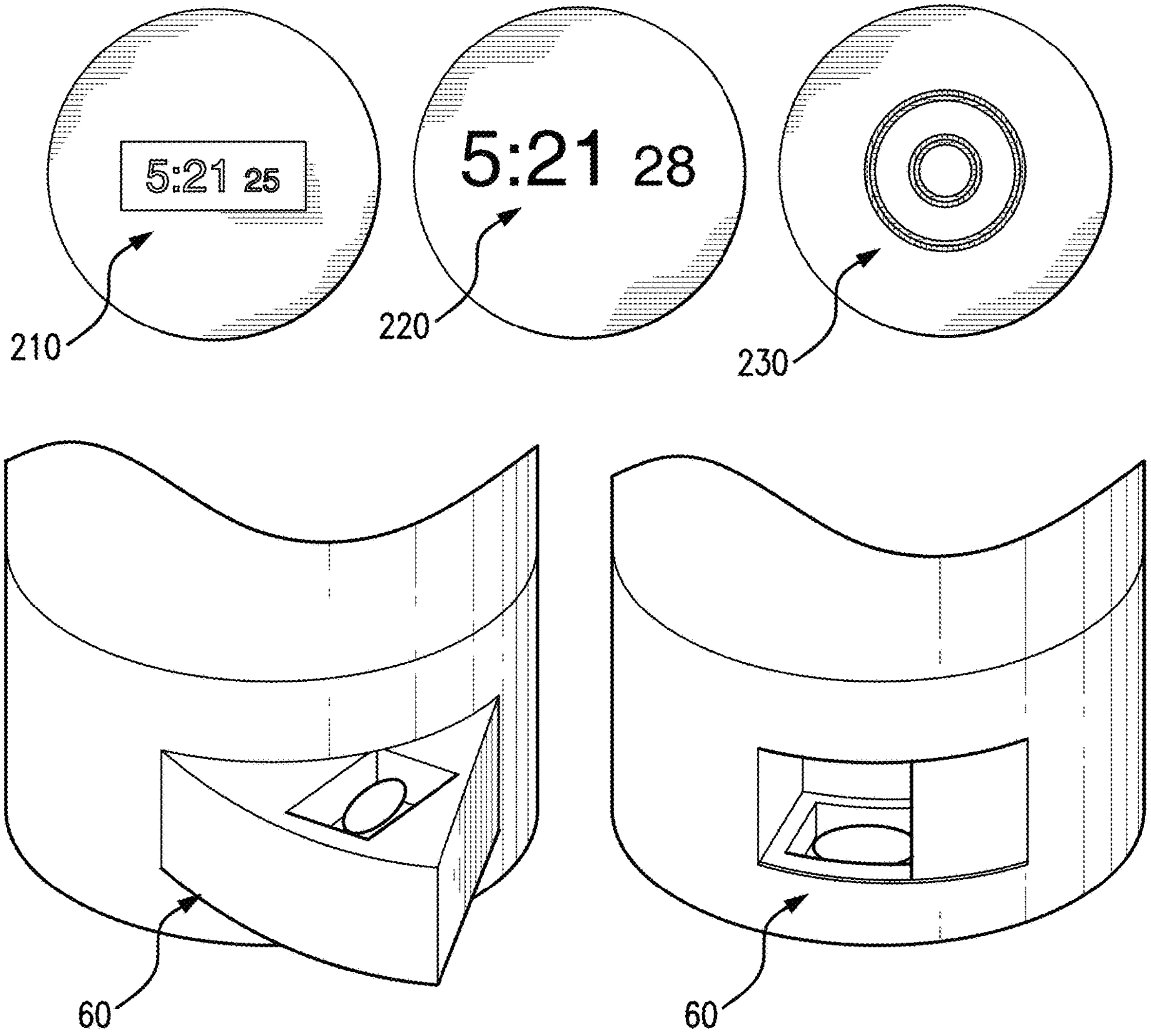
FIG. 4 shows options for the displays for the clock or timer and options for the medication drawer in the device.

As shown in FIGS. 2 and 4, the device 10 can include a display 200, or displays 210, 220, 230 for displaying selected information. According to one embodiment, the display 200 displays a timer. As soon as the rotatable top 50 is rotated to engage release of medication, the timer starts again, and the lock is re-engaged. The rotatable top 50 may also include a dispensing timer that employs digital timer technology and circuitry powered by a portable power source, such as a battery, and/or can be externally recharged. The timer can be set to count down a specified number of hours by the pharmacist/authorized user through the input port based on prescription parameters. In use, the clock or timer may be reset by the system 10 when the top 50 is fractionally rotated, is opened, or based on other selected parameters (passage of time, external wired or wireless control, etc.). The timer may release a drawer lock to open the dispenser 60. The drawer lock may be electronic, mechanical, or magnetic and may operate when it reaches zero "0:00", or otherwise reaches a suitable open time period. The data inputs for the timer and related controls can be manual, electronic, Bluetooth, magnetic or any other suitable means. The device 10 may optionally include one or more manual buttons to set the clock, for instance, on the top 50 or on the internal surface of the base 30.

According to another embodiment, and as shown in FIGS. 2 and 4, the display 200, 210, 220 or 230 can include an easy to read interface that may be a digital clock or simple red/green LED indicator, incorporating or not incorporating a vibratory "buzzer" or other audible cue system. Likewise, the display 200, 210, 220 or 230 can be suitably programmed to display selected types of information related to the patient, medication and/or timer, including for example a countdown timer that counts down from the last time the medication was released and manually accessed or removed from the drawer, or the number of pills remaining to be dispensed. The timer may optionally include an LED or other visual display on the surface of the top 50 or base 30 or the housing 20 that is optionally color-coded (e.g., red for locked and green for unlocked), for instance display 240 in FIG. 3, based on the status of the countdown and/or whether the dispenser 60 is locked or unlocked.

The timer lock may be designed to be pre-programmed by the pharmacist, technician, or authorized user for the prescribed dosing interval ("every 8 hours", "twice a day", "8:00 in the am" etc.). In certain embodiments, the rotatable top 50 can only be rotated by the user and thereby release a dose (for instance a single pill, or combination of pills), based on the control of the timer and timing of the dose. In a preferred embodiment, each rotation or dispensing of a dose resets the process, and may reset the timer, and the container 10 is effectively relocked until the next timed interval. The timer lock may operate in conjunction with an associated application, for instance a computerized application that runs on a smartphone, laptop, desktop, or other computer, that allows an authorized user to override, control, reset and otherwise program the timer lock.

The container of the device 10 may include a base 30 that may be cylindrical and may have the same diameter and may be composed of the same material as the housing 20. The base 30 may be further configured to seamlessly accommodate its insertion and locking onto the housing 20. The base 30 may include a dispenser 60 with features such as a "push-and-pop" spring-loaded drawer, opening or container, a release shoot with a sliding door, a cup that can be twisted out from the base, storage area with a sliding door, or other similar pill release reservoir that stores a released dose in the base 30 until the user engages the dispenser 60 (FIGS. 2, 4 and 5). The dispenser 60 may be configured to be movable between a retracted position and a deployed position. In the retracted position, the dispenser 60 seats within the base 30 and may be seamless with the base 30 and/or the housing 20. The dispenser 60 may include an internal space that accommodates approximately one or more large pills or tablets. This space may be termed the dose cup.

With each timed release of a pill dose, gravity can cause the dose to drop out of the respective disk compartment into the dispenser's 60 dose cup or other similar mechanism. The user can then mechanically engage the dispenser 60 or other mechanism to access the dose. The dispenser 60 is configured such that the pill dose remains secured in the base 60. According to another optional embodiment, the dispenser 60 may be electronically linked to the rotatable top and timer mechanism and locked into the closed position except by timed unlock, thereby increasing access security.

A locking mechanism may lock the shaft 70 to the base 30 and prevent the user from direct access to the medication and the disk stack 40. This locking mechanism may be mechanical, key accessed, magnetic, electronic or computerized. The locking mechanism can also optionally require the use of a key, a magnetic or RFID mechanism or card, the entry of data, a code, or the use of an input cord, app, or wireless (e.g., Bluetooth) connection or a similar digital design. The locking mechanism may also lock the housing 20 (preferably in a seamless fashion) to the base 30, thereby preventing the user or other persons from accessing any of the internal components or the contents of the pill disk containers (medication). In a preferred embodiment, only the pharmacist or the person filling the prescription or other authorized user is provided the ability to lock and unlock the housing 20 from the base 30, thereby preventing tampering and misuse or abuse of the medication.

The present disclosure is thus directed to be a hand-held, portable, secure pill or medication bottle or container configured to dispense a single dose (e.g., one or more pills, tablets, capsules, etc.) in a preprogrammed and timed manner. The container is preferably durable, tamper-resistant or tamper-proof, and helps prevent the intentional or accidental exposure to more than the recommended dosage at any one time.

In certain embodiments, a method is provided, which may include two or more of the following steps:

1. A prescriber designates prescription medication, dose, frequency, and quantity.
2. A pill stack delivery disk is selected by a pharmacist or other authorized user for instance based on pill number, size and/or volume. The pills may then be loaded into the disk by pharmacist or authorized user. A plurality of loaded disks may be stacked on the shaft.
3. The twisting top timer may be programmed by the pharmacist or authorized user.
4. The base may be locked onto the shaft and stacked pill disks.
5. The durable outer shell and twisting top section may be slid over the components and locked onto the base.
6. The timer countdown may start by press of a button or, for instance, once the top has been rotated by a predetermined amount or a fractional turn.
7. The twisting top only unlocks for the next rotation and dose release when timer countdown is complete or has passed a certain amount of predetermined time.
8. Upon unlock, the patient or other person may rotate the top to cause one or more disks to rotate, thereby releasing a dose as described herein. A separate lock may be provided to ensure that only an authorized user is able to rotate the top. For instance, a manual or digital code or key that must entered to allow rotation of the top. This provides a form of multifactor authentication to release of a given dose.
8. The timer screen may display a time countdown to the next dose and the number of pills remaining along with related information.
9. When empty, the container can be returned to the pharmacist/authorized user for unlocking, reset, and refill.

While the various steps of the method listed above are enumerated, it should be understood and is expressly contemplated for this disclosure that the method is not limited to the particular order or sequence steps shown above.

In another embodiment a method is provided and includes the steps of rotating a rotatable top of a medication dispensing assembly as described herein. This rotation causes one or more stacked medication dose storage disks to rotate, thereby causing a storage compartment within one of the storage disks to line up with a gap in an adjacent storage disk, thereby releasing a dose from the storage compartment to a dispensing compartment in the assembly. The method may also include removing the dose from the dispensing compartment in the assembly.

The method may additionally include the step of measuring a predetermined amount of time with a timer and unlocking the rotatable top of the medication dispensing assembly only upon passage of the predetermined amount of time.

In the aforementioned manner, the present disclosure is directed to a medication container for dispensing medicine, such as pills, to a patient in a time-controlled and secure way. The disclosed device and methods provide a number of advantages of previously-known or available devices and methods, including:

1. The medication container is specifically adapted to address outpatient day-to-day safe dosing of controlled and high-risk medications.
2. The hand-held size is similar in size to existing pill bottles.
3. The system is inexpensive and simply designed for practical use, thereby allowing for inexpensive manufacture and hundreds of millions of units in a real-world application.
4. The timed dosage allows for secure timed release of single or multiple pills, and the container is otherwise locked.
5. The system can requires user intervention to reset the timer, for instance, rotation of twisting top and release of a predosed medication to a drawer/receptacle once the timer counts to zero or another "release" state.
6. The system is tamper resistant for patients, family, and children.
7. The system prevents exposure to full pill quantities, for instance, several hundred pills simultaneously (15 billion+pills dispensed per year in US).
8. The system decreases intentional and unintentional overdose risk (100 million+prescription ODs per year).
9. The system decreases poisoning risk to children and pets (129,000 analgesic poisonings, 18% all fatal poisonings are pain medications).
10. The system decreases risk of diversion (access to diverted pills is a huge contributing factor to addiction and overdoses).
11. The system decreases misuse (overuse, early use, abuse, increased dose).
12. The system is expected to reduce risk addiction due to timed release (no escalation of use possible as time controlled).
13. The system has the potential to save thousands of lives per year (23 thousand deaths annually in US alone directly from prescription medication and large percentage of all fatal ODs—70 million/year have prescription medication in system).
14. The system helps to ensure a prescription is dosed as prescribed in single or multiple units and in a timed fashion.
15. The system gives pharmacist/authorized users sole access to large pill quantities.
16. The system reduces liability risk for prescriber, pharmacy, pill manufacturer.
17. The system permits larger pill volumes to be prescribed safely (therefore less frequent fills).
18. The system permits high risk medications to be utilized safely for those who need them.
19. The system is reusable and environmentally friendly, dramatically reducing plastic bottle waste (over 100 M plastic pill bottles per year).
20. The system is envisioned to be scalable if nationally mandated for use with all CMs (400+M scripts per year) due to low-cost design/manufacture and reusability.
21. The system is envisioned for use with any high-risk or controlled medication as well as any medication requiring timed administration.

While the disclosure provides certain exemplary embodiments, those skilled in the art may make various modifications to the described embodiments without departing from the true spirit and scope of the disclosure. The terms and descriptions used herein are set forth by way of illustration only and not meant as limitations. In particular, although the present disclosure is provided by way of examples, a variety of devices would practice the inventive concepts described herein. Although the disclosure provides various terms and certain embodiments, the scope of the disclosure is not intended to be, nor should it be deemed to be, limited thereby and such other modifications or embodiments as may be suggested by the teachings herein are particularly reserved, especially as they fall within the breadth and scope of the claims here appended. It is expressly contemplated that the features and elements of the various embodiments described herein may be combined and the full variety of combinations and permutations are expressly contemplated by this disclosure. Those skilled in the art will recognize that these and other variations are possible within the spirit and scope of the disclosure as defined in the following claims and their equivalents.

What is claimed is:

1. An assembly for a medication dispensing system comprising:

a plurality of stacked medication dose storage disks having a generally flat circular shape, each disk having a plurality of defined storage compartments for holding individual doses of medication, each storage compartment having two side walls, the side walls extending radially outward from near the middle of the circular disk, one or more of the stacked medication dose storage disks having a gap configured to allow a pill to pass from a storage disk above it, through the storage disk and to a dispenser below the plurality of stackable stacked medication dose storage disks, the gap having two side walls, the side walls extending radially outward from near the middle of the circular disk; and a planar separator positioned adjacent at least one storage disk, the separator having a gap configured to allow a pill to fall through said gap when a storage compartment on an adjacent storage disk is aligned with the gap, wherein the plurality of stacked medication dose storage disks is arranged so that when the disks and separator are stacked and the gaps of several of the disks and separator are aligned, a pill can pass through the gaps of several stacked medication dose storage disks to the dispenser.

2. The assembly of claim 1, further comprising:

a top wall for each storage compartment, the top wall being provided above the compartment.

3. The assembly of claim 1, further comprising:

a plurality of flat planar separators, one separator being provided between adjacent storage disks so as to separate individual doses of medications from the doses in the adjacent storage disks, each separator having a gap configured to allow a pill to fall through said gap when a storage compartment on an adjacent storage disk is aligned with the gap.

4. The assembly of claim 1, further comprising:

a shaft extending through the central axis of the plurality of stacked medication dose storage disks such that a set of the plurality of stacked medication dose storage disks can rotate about the shaft.

5. The assembly of claim 1, further comprising:

a lower engagement mechanism on a medication dose storage disk included within the plurality of stacked medication dose storage disks; and an upper engagement mechanism on a medication dose storage disk included within the plurality of stacked medication dose storage disks;

wherein the lower engagement mechanism on one medication dose storage disk is configured to engage the upper engagement mechanism on an adjacent medication dose storage disk such that when the lower engagement mechanism and the upper engagement mechanism are engaged, the two medication dose storage disks rotate together.

6. The assembly of claim 5, wherein the upper engagement mechanism and the lower engagement mechanism are selected from the group consisting of an edge, bevel, tab, block and protrusion.

7. The assembly of claim 5, wherein the plurality of medication dose storage disks each have an upper engagement mechanism and a lower engagement mechanism.

8. The assembly of claim 1, further comprising:

a rotatably attached top;

an outer shell; and a base, wherein the outer shell is configured to securely engage the top and the base and thereby provide a secure container for the medication to be stored and dispensed therefrom.

9. The assembly of claim 8, wherein the outer shell and the base are formed as a single component.

10. The assembly of claim 8, further comprising:

a lock mechanism, the lock mechanism configured to only allow release of a medication dose from the assembly after a predetermined period of time has passed.

11. The assembly of claim 8, further comprising:

a dispensing compartment in the base provided with an opening mechanism, the dispensing compartment being configured to receive a medication dose released from the stacked medication dose storage disks and the opening mechanism being configured to allow a user to withdraw the released medication dose from the assembly.

12. The assembly of claim 8, further comprising:

a timer with a display, the timer working to unlock a locking mechanism upon passage of a predetermined time period, said locking mechanism preventing rotation of the rotatable top relative to the assembly until the locking mechanism is unlocked.

13. The assembly of claim 12, wherein the timer and locking mechanism are configured so that rotation of the rotatable top resets the timer and locks the locking mechanism, effectively securing the assembly until the predetermined time period has passed.

14. The assembly of claim 12, wherein the locking mechanism comprises a servomotor operating an engagement arm that prevents rotation of the rotatable top.

15. The assembly of claim 1, further comprising:

a reload lock mechanism, wherein the reload lock mechanism allows an authorized user to open and reload the medication doses into the medication dose storage disks.

16. A method comprising the steps of:

measuring a predetermined amount of time with a timer and unlocking the rotatable top of the medication dispensing assembly according to claim 1 only upon passage of the predetermined amount of time, and rotating a rotatable top of the medication dispensing assembly to cause one or more stacked medication dose storage disks to rotate, thereby causing a storage compartment within one of the storage disks to line up with the gap in an adjacent storage disk, and releasing a dose to a dispensing compartment in the assembly.

17. An assembly for a medication dispensing system comprising:

a plurality of stacked medication dose storage disks having a generally flat circular shape, each disk having a plurality of defined storage compartments for holding individual doses of medication, each storage compartment having a top wall, the top wall being provided above the storage compartment, two side walls, the side walls extending radially outward from near the middle of the circular disk, one or more of the stacked medication dose storage disks having a gap configured to allow a pill to pass from a storage disk above it, through the storage disk and to a dispenser below the plurality of stacked medication dose storage disks, the gap having two side walls, the side walls extending radially outward from near the middle of the circular disk, wherein the plurality of stacked medication dose storage disks is arranged so that when the disks are stacked and the gaps of several of the disks are aligned, a pill can pass through the gaps of several stacked medication dose storage disks to the dispenser.

18. An assembly for a medication dispensing system comprising:

a rotatably attached top;

an outer shell;

a base, wherein the outer shell is configured to securely engage the top and the base and thereby provide a secure container for the medication to be stored and dispensed therefrom; and a plurality of stacked medication dose storage disks having a generally flat circular shape, each disk having a plurality of defined storage compartments for holding individual doses of medication, each storage compartment having two side walls, the side walls extending radially outward from near the middle of the circular disk, one or more of the stacked medication dose storage disks having a gap configured to allow a pill to pass from a storage disk above it, through the storage disk and to a dispenser below the plurality of stacked medication dose storage disks, the gap having two side walls, the side walls extending radially outward from near the middle of the circular disk, wherein the plurality of stacked medication dose storage disks are arranged so that when the disks are stacked and the gaps of several of the disks are aligned, a pill can pass through the gaps of several stacked medication dose storage disks to a dispenser.

* * * * *